United States Patent [19]

Wyatt

[11] Patent Number: 5,145,090

[45] Date of Patent: Sep. 8, 1992

[54] ARTICLE WITH SNAP-FIT CONNECTION

[76] Inventor: W. Burk Wyatt, 9545 Inavale Dr., Brentwood, Tenn. 37027

[21] Appl. No.: 734,086

[22] Filed: Jul. 22, 1991

Related U.S. Application Data

[63] Continuation of Ser. No. 357,269, May 26, 1989, abandoned.

[51] Int. Cl.$^5$ .............................................. B65D 7/00
[52] U.S. Cl. ..................................... 220/444; 220/469
[58] Field of Search ....................... 220/444, 469, 23.6, 220/23.7

[56] References Cited

U.S. PATENT DOCUMENTS 3,118,560  1/1964  Cornelius ..................... 220/469 X
4,946,064  8/1990  Van Cucha ........................ 220/355

OTHER PUBLICATIONS

The Plastics Manual, 3rd Edition, Applied Plastics, 1966, pp. 163-166.
Handbook of Plastics, Simonds & Ellis, 1943, pp. 579-584.

*Primary Examiner*—Steven M. Pollard
*Attorney, Agent, or Firm*—Banner, Birch, McKie & Beckett

[57] ABSTRACT

An article, preferably an insulated food serving unit such as a tray or a tray cover, having a top shell and a bottom shell which are physically interlocked with a snap-fit connection. A rigid, substantially dimensionally stable foam between the top and bottom shells locks the shells together, seals the snap-fit connection and provides rigidity to the overall article. Reinforcing ribs may be used to decrease flexure at the connection seam and protect the foam against impact at the connection seal.

22 Claims, 5 Drawing Sheets

ARTICLE WITH SNAP-FIT CONNECTION

This application is a continuation of application Ser. No. 07/357,269, filed May 26, 1989 now abandoned.

FIELD OF THE INVENTION

The invention relates to food serving units such as trays and covers for trays, and other generally planar articles having top and bottom shells interconnected by a physical snap-fit configuration. An insulating foam is desirably disposed between the top and bottom shells to prevent separation of the shells and add rigidity to the overall structure.

BACKGROUND OF THE INVENTION

Trays and other such generally planar articles are frequently used for holding a wide variety of foods and meal service items. The food industry has adopted food serving units including such trays and tray covers for maintaining temperature and serving meals on a large scale, commercial basis. Because of the increasing demand for such food serving units, manufacturers have sought to develop trays that are low cost, rigid, durable, and able to withstand numerous cleanings. In particular, the industry has sought to develop a tray and tray cover that can chemically withstand abrasive cleaners and harsh rinsing aids which substantially shorten the useful life of trays.

The difficulties associated with developing acceptable trays and tray covers was compounded when the food service industry expressed a desired for insulated trays and tray covers that could serve hot and cold items simultaneously without sacrificing rigidity or integrity. The solution found by the industry was the use of rigid plastics (e.g., polycarbonate, ABS, polyester, and polystyrene) which were thermoformed into two parts. See, U.S. Pat. Nos. 3,799,386; 4,386,703; and 4,545,487. A self expanding foam was used to insulate the tray and tray cover compartments and chemically bond the top and bottom parts together. A typical polycarbonate tray or tray cover, generally referred to as a food serving unit was made with the following steps:

1. Thermoforming sheets of polycarbonate into top and bottom shells having a flat rim around the unit;
2. Roughly reducing the size of the thermoformed shells by die-cutting each shell;
3. Drilling vent holes into the top and/or bottom shells;
4. Pouring a self expanding foam into one of the shells;
5. Adding a reinforcing rim to either the top or bottom shell with a solvent adhesive;
6. Applying a solvent adhesive to the top and bottom rims;
7. Assembling the top and bottom shells;
8. Clamping the shells together while the foam expands inside the unit and the solvent adhesive cures; and
9. Manually removing the excess rim material with a router and sanding the routed seam to a smooth finish.

Initially, these polycarbonate trays/tray covers proved to be useful despite the labor intensive process required for their assembly. It became apparent, however, that the polycarbonate trays/tray covers were adversely reacting with certain chemicals used in commercial cleaning operations. The effects of the adverse reactions was apparent by the formation of stress cracks on the tray/tray cover, separation of the adhered rim joint, and ultimate failure of the tray.

Over the years, coated and modified polycarbonates have been developed to increase their resistance to chemical degradation from commercial cleaning operations. While such coated and modified polycarbonates extend the useful life of the trays and tray covers to some degree, better chemical resistance is still desirable and the cost of these polycarbonates is relatively high. Clearly, a better alternative to polycarbonate food serving units would be desirable to enhance the durability of the units, simplify their method of assembly, and reduce their material cost.

Polypropylene is one potentially useful plastic material that is inexpensive and has better chemical resistance to cleaning chemicals than polycarbonates. Polypropylene was suggested for trays in U.S. Pat. Nos. Re. 30,969; 3,532,237; 3,754,640; and 3,799,143. Unfortunately, the same chemical resistance that would make polypropylene desirable as a food serving unit also renders the parts of the unit difficult to join. Very few solvent adhesives will react with polypropylene, and those that do (gasoline, benzene, carbon tetrachloride, acetone, alcohol, and wet chlorine) are not practical.

Indeed, one of the few ways to obtain a polypropylene joint with integrity is by fusing the seam surfaces together with applied or induced heat and pressure. "Spin welding" is one way of inducing fusion heat as described in GB 949,338. Spin welding is not available, however, to articles having a noncircular shape, and traditional thermal fusion with heated irons or plates results in the need for substantial maintenance and cleaning of molten plastic.

Insulated trays have been recently manufactured from thermoformed sheets of polypropylene. The manufacturing technique used to assemble the polypropylene trays is similar to the above technique for assembling polycarbonate trays and, thus, has similar labor cost and waste problems. That is, since the top and bottom shells are made from flat sheets, material waste occurs in addition to the time consuming steps of die cutting, drilling vent holes, clamping the parts, and removing excess rim material. The thermoformed polypropylene rims are fused by using heated plates despite their need for periodic cleaning and maintenance.

Additional problems would be presented if traditional injection molding was used for making planar products from polypropylene. Polypropylene exhibits substantial shrinkage upon removal from a conventional injection molding operation. This shrinking action would cause warping in relatively large, planar parts (e.g. shells for food trays or food tray covers) and would prohibit the accurate joining of one shell to the other.

It would be desirable to have a tray, tray cover or similar, generally planar article that could be made of inexpensive, chemically resistant materials with a process that is less labor intensive than previous processes.

It would also be useful to have an insulated tray or tray cover that could be made of a wide variety of relatively flexible plastic materials while retaining a high overall rigidity and structural integrity over an extended period of time.

It would further be advantageous to have a method for making trays and tray covers that was inexpensive, would produce little waste material, and would not require an idle period waiting for solvent adhesives to cure.

SUMMARY OF THE INVENTION

It is an object of the invention to provide a food serving unit (such as a tray or tray cover, or other generally planar article) that is made of plastic materials that can resist chemical degradation by commercial cleaning processes.

It is a further object to provide an insulated food serving unit having good rigidity and structural integrity.

It is also an object to provide a food serving unit having top and bottom shells that can be physically joined together, such as with an interlocking snap-fit connection, and thereby free a manufacturer to choose from a wide variety of chemically resistant materials that are not otherwise easily bonded or fused together.

In the process aspect of the invention, it is an object of the invention to provide a method of making trays, tray covers and other such generally planar articles with less manual manipulation than the prior processes, little wasted material, and short manufacturing cycle times for each article.

It is another object of the process aspect of the invention to supply a method for making insulating trays and tray covers that can form vent holes during the process without the need for a separate drilling step.

It is a further object of the process aspect to provide a tray and tray cover manufacturing process that produces trays and tray covers that require little post formation processing to produce an aesthetic article.

In accordance with the objects noted above and others that will become apparent from the description herein, generally planar food serving units, e.g. trays or tray covers, according to the invention have top and bottom shells joined together with an interlocking, snap-fit connection. Each shell has a generally planar, extended surface, sidewalls, and an interlocking configuration associated with a structural member on one shell that forms an interlocking, snap-fit connection with a structural member on the other shell. Preferred structural members are rims located on the terminal edge of each sidewall and which exhibit a mated, snap-fit configuration comprising a hook-shaped portion in one rim and an undercut portion in the other rim.

The snap-fit connection according to the invention provides a physical joining of the shells that permits the shells to be assembled quickly and independently of chemical interactions. This freedom from chemical adhesives opens the way for using a wide variety of chemically resistant plastics, which are desirable to use in the food tray environment, and that have hitherto been considered unjoinable without thermal bonding.

The snap-fit connection also alleviates the problems of maintenance, cleaning and post-joining processing inherent in fusion bonding. In a preferred embodiment, a polyolefin copolymer of polypropylene and polyethylene is used. Such a material has the advantage of being relatively inexpensive compared to the modified polycarbonates used in prior art trays.

A self expanding form that cures to a substantially rigid structure is preferably used inside the article, inter alia, to insulate the article and increase its overall structural rigidity. When a chemically resistant material is used as the top and bottom shells, the shells are suitably treated so that the foam can bond to the interior surfaces of each article shell. Such bonding adds yet additional rigidity to the article and serves to enhance the integrity of the snap-fit connection joint. The cured foam so enhances the dimensional integrity of the article that plastics previously considered unsuitable due to low heat deflection temperatures, such as the polyolefin copolymer mentioned above, may be used. This property makes possible an even wider variety of plastic materials, many of which have excellent chemical resistance to the agents used in commercial cleaning processes.

The foam also serves to force the snap-fit connections together by applying outward separation forces to the shells. The foam is usually poured as a reacting liquid into one of the shells, and the shells are then joined. The reaction transforms the liquid into a rigid foam having about 30 times the volume of the initial liquid. This expansion exerts outward separation forces on the shells, and thus to the snap-fit connection. The snap-fit surfaces are, therefore, forced together into a secure, mated connection. In addition, the foam cures without substantial shrinkage thereby fixing the snap-fit surfaces in that secured configuration.

Appropriate physical bracing may be added to the sidewalls of the top and bottom shells to further enhance the rigidity of the connection seam and, in one embodiment of the invention, to exhibit the interlocking configurations used to connect the top and bottom shells. Bracing permits the use of plastics that were previously thought to be too flexible for load supporting planar articles (like meal serving trays) and maintains the integrity of the snap-fit connections despite impact abuse.

The present invention is also directed to a process for making insulated, generally planar, food serving units (such as a trays or tray covers) with a plastic material that is sufficiently flexible to be removable from a mold exhibiting a configuration to produce shells having occluded elements which will ultimately mate with a corresponding shell to form a snap-fit connection. Injection molding is a preferred method of making the individual elements of the food serving unit. An expanding foam is preferably introduced into one or both of the shells and allowed to expand. Mating shells are joined at their interlocking surfaces while the foam expands into substantially the entire interior volume and cures.

The expanded scope of materials and the use of injection molding made possible by the invention free the manufacturer from the constraints and waste associated with thermoforming. Elongated planar articles (like meal trays and tray covers) can be made by injection molding with very little wasted material. The process of injection molding a shell also permits various structural features, such as vent holes and/or reinforcing elements, to be molded into the part rather than formed after molding thereby eliminating certain handling steps previously required. Exemplary steps include die-cutting, fusion heating or solvent curing, and post-joining finishing of the joint seam. Such an elimination of process steps reduces the average tray or tray cover "cycle" (the time to make each tray or tray cover) thereby increasing the efficiency of an existing manufacturing facility and reducing the average cost of each tray. In an expanding industry, such a competitive edge affords substantial opportunities to a manufacturer operating in accordance with the invention.

DETAILED DESCRIPTION

Figure 1:
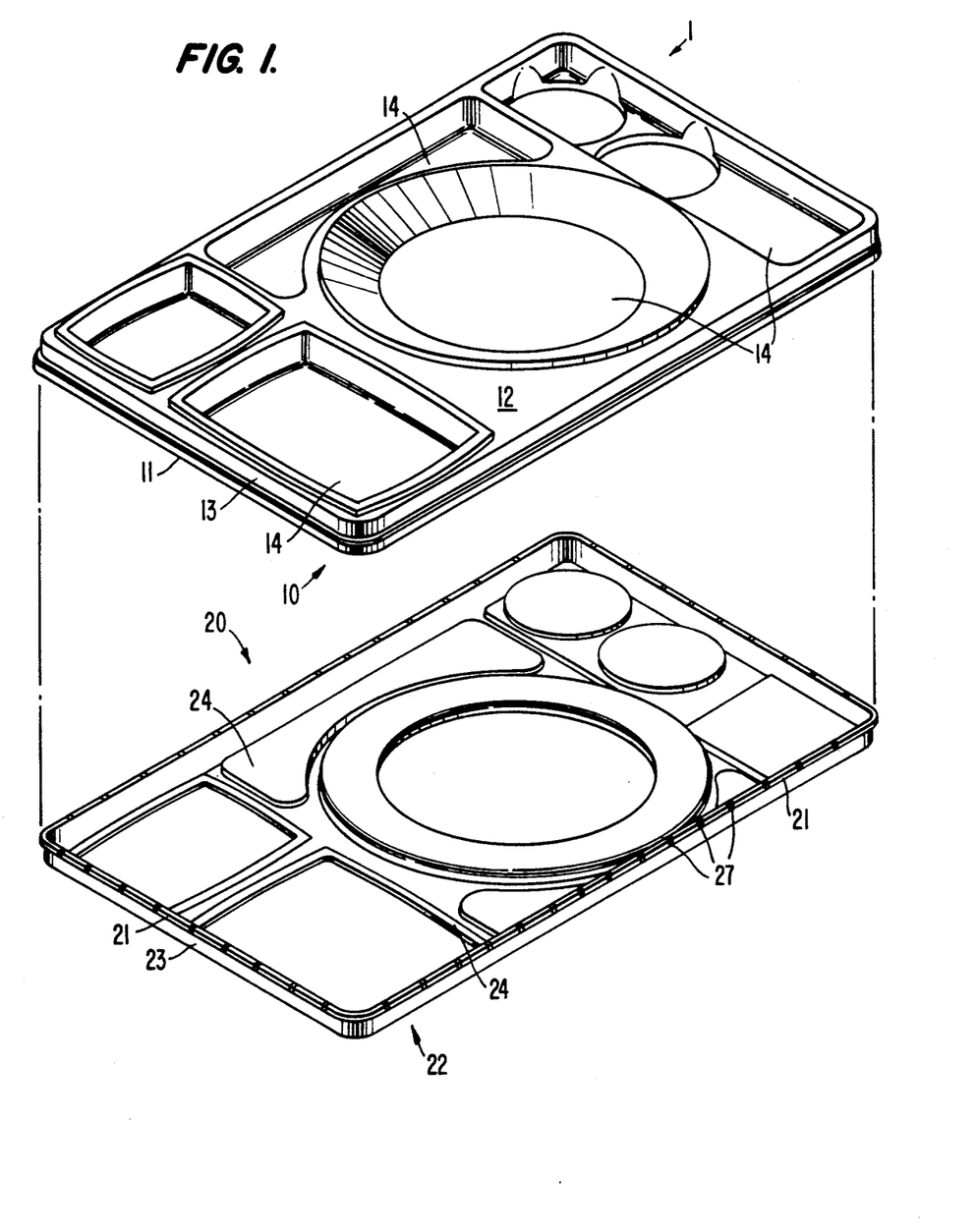
FIG. 1 is an exploded perspective view illustrating a top and bottom tray shell before joinder with a snap-fit connection.
Figure 9:
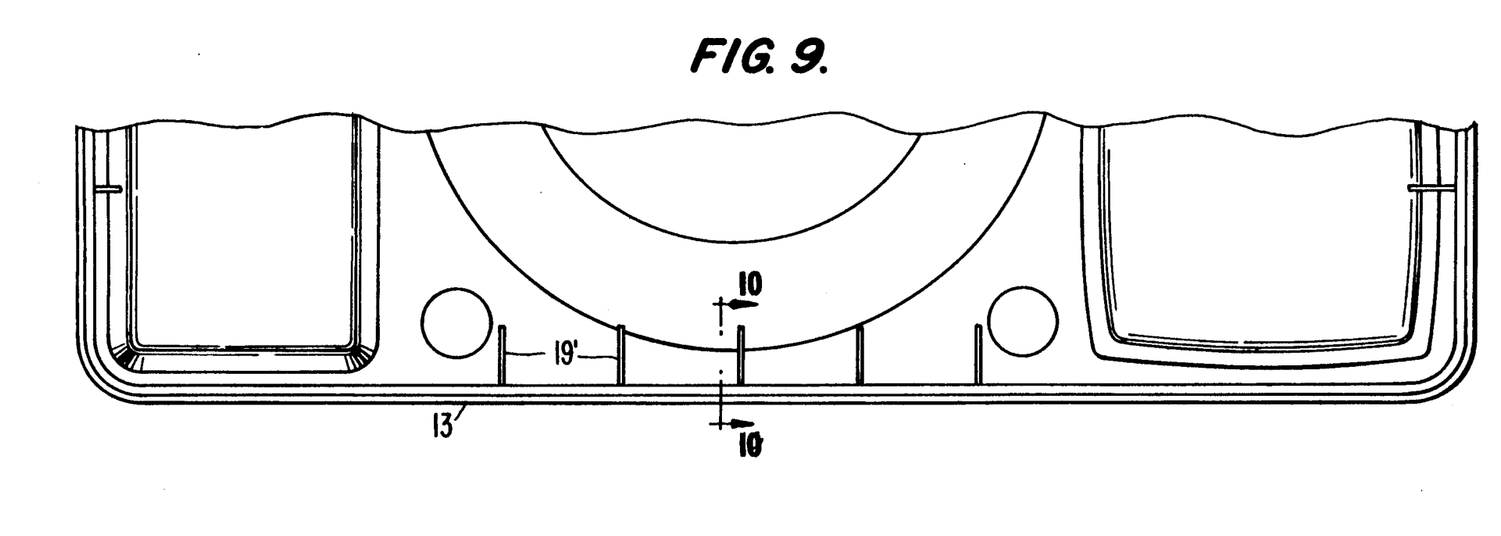
FIG. 9 is a partial plan view of the underside of an alternate top tray shell having reinforcing ribs that extend away from a sidewall for a distance.
Figure 10:
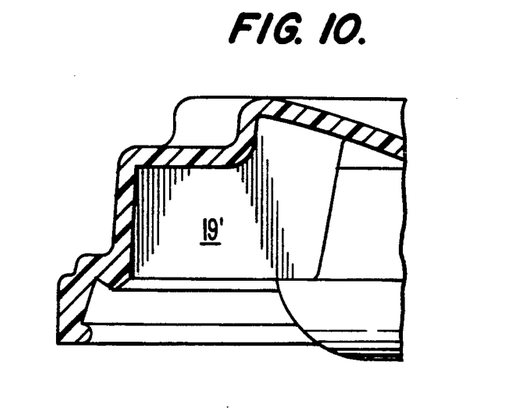
FIG. 10 is a cross-sectional view taken along line 10—10 of FIG. 9 of a reinforcing rib in FIG. 9.
Figure 11:
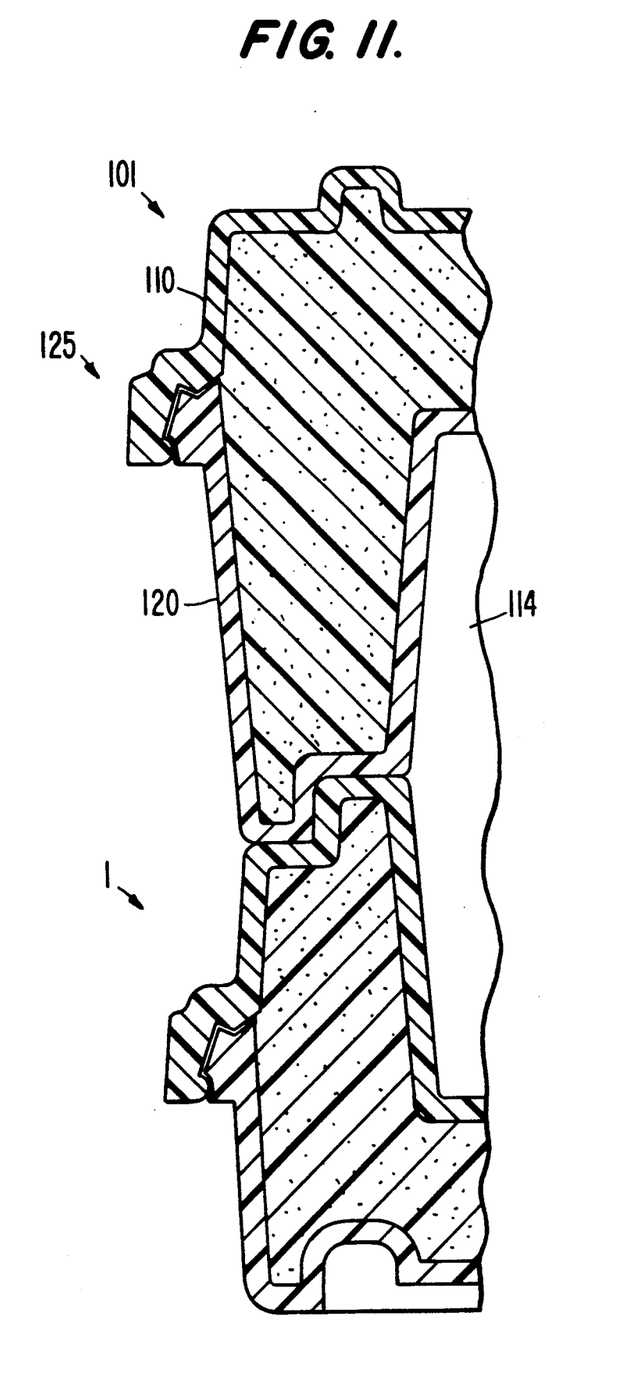
FIG. 11 is a partial sectional view of a tray and mating tray cover both having shells joined with an interlocking snap-fit connection and filled with a foam insulating material.

Referring to the drawings wherein like numbers indicate like elements, there is illustrated a generally planar article according to the invention. In FIG. 1–10, the illustrated article is a food serving unit in the form of a tray 1 designed to function as an insulated food serving tray. FIG. 11 illustrates both a tray 1 and a mating tray cover 101. Tray 1 is formed of a top tray shell 10 joined to a bottom tray shell 20. A foam insulation material 17 fills in the interior volume between shells 10 and 20. FIG. 1 shows top tray shell 10 separated from bottom tray shell 20. Top tray shell 10 includes a generally planar top surface 12, sidewalls 13 extending transversely from, and around, the perimeter of surface 12, and a top rim 11 attached to the terminal edge of sidewalls 13. Bottom tray shell 20 includes a generally planar bottom surface 22, sidewalls 23 extending transversely from, and around, the perimeter of surface 22, and a bottom rim 21 attached to the terminal edge of sidewalls 23.

Sidewalls 13 and 23 serve to space apart top and bottom shells 10 and 20 thereby allowing shells 10 and 20 to contain shaped depressions 14 and bottom contours 24 which protrude generally toward the interior of the tray. Depressions 14 may be designed to hold foods, food containing inserts, and/or meal utensils as is conventional for insulated trays. Additionally, tray depressions 14 may have rims protruding away from the tray interior which are shaped to mate with contours 24 for insulated stacking and/or alignment of cold or hot food items as described in U.S. Pat. Nos. 3,122,265; 3,532,247; Re. 30,962; 3,754,640; 3,613,933; 3,799,143; 3,799,386; 3,949,876; 4,052,589; 4,386,703; 4,440,303; 4,533,061; 4,545,487; 4,546,899; and 4,668,567 which are all incorporated herein by reference. Depressions 14 and contours 24 may be located in various combinations in either top tray shell 10 and/or bottom shell 20 to achieve oriented stacking as desired.

Depressions 14 in top shell 10 form angled surfaces 15 on what will become the interior surfaces of tray 1 when top and bottom shells 10 and 20 are interconnected. Surfaces 15 will extend away from the surface plane of their respective shell at a variety of actual angles (alpha less than about 100°) to the shell surface and are preferably at some acute or right angle. As will be described later, angled surfaces 15 may be used in conjunction with ribs 19 to increase the rigidity of sidewalls 13 and/or 23.

Figure 4:
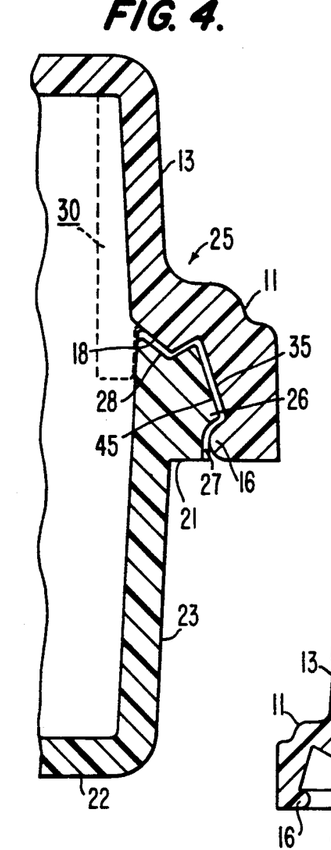
FIG. 4 is a cross-sectional view taken along line 4—4 of FIG. 2 illustrating an interlocking snap-fit connection according to the invention.

Top tray shell 10 is joined to bottom tray shell 20 with a snap-fit connection 25 by the interlocking configuration of top rim 11 and bottom rim 21. The illustrated shapes of rims 11 and 21 are a preferred form and location for top and bottom shell connection means according to the invention, while other snap-fit configurations can be used in accordance with the invention. Certain variations to this embodiment will be noted below. As shown in FIG. 4, snap-fit connection 25 has a hook shaped portion 16 on top rim 11 that mates with an undercut portion 26 in bottom rim 21. If desired, the opposite orientation may be used.

Figure 3:
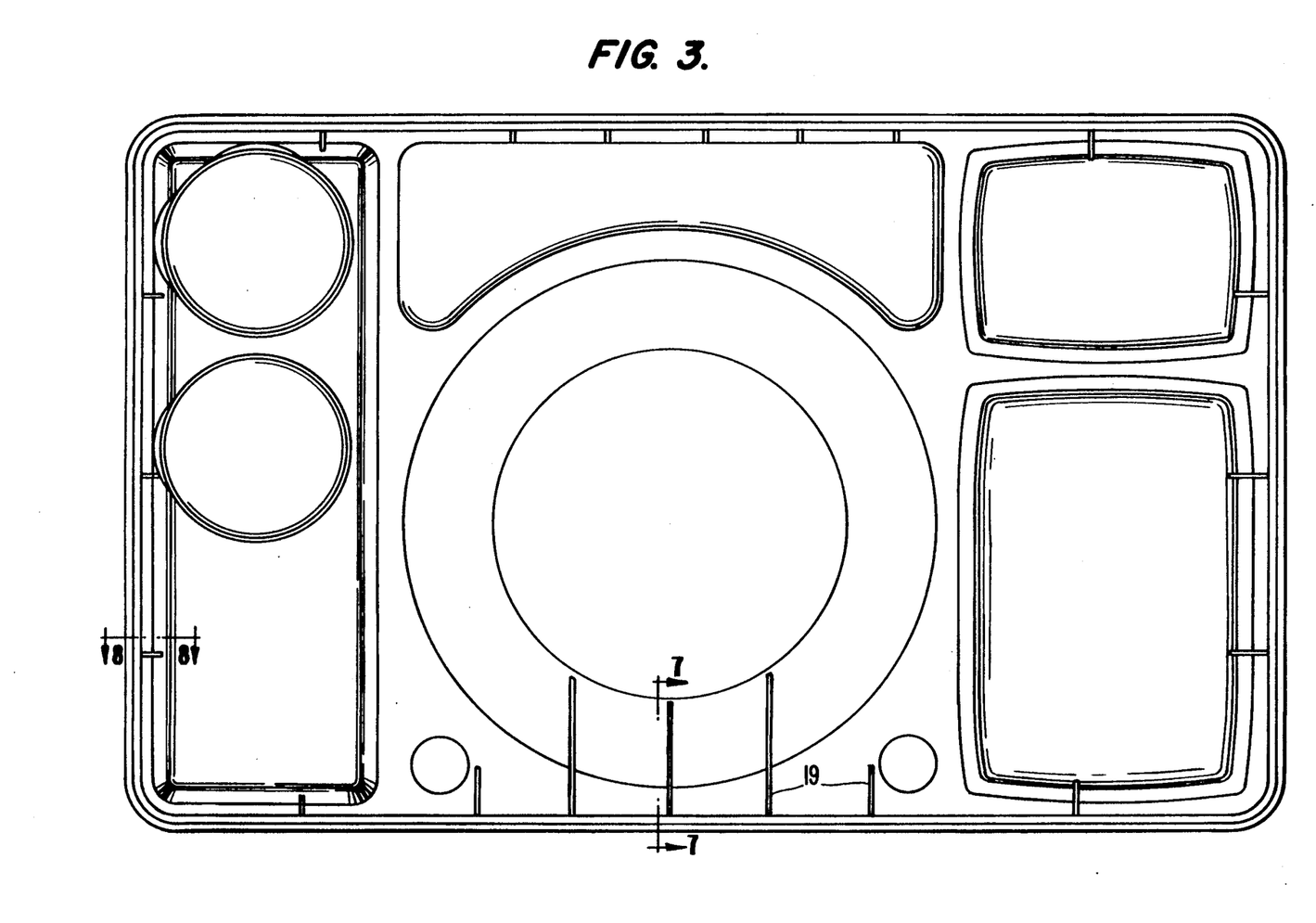
FIG. 3 is a plan view illustrating an arrangement of surface depressions and reinforcing ribs from the underside of a top tray shell.

Snap-fit connections 25 may be distributed continuously or discontinuously around the periphery of tray shells 10 and 20. Preferably, as seen in FIGS. 1 and 3, hook-shaped portion 16 and undercut portion 26 are distributed substantially continuously over the terminal edges of rims 11 and 21 around the entire periphery of tray shells 10 and 20.

Details of snap-fit connection 25 are best seen in FIG. 4. Sidewall 13 extends transversely downward from top surface 12, and rim 11 is formed as a thickened distal portion of sidewall 13. Rim 11 extends both laterally outward and downward from sidewall 13. Hook-shaped portion 16 is formed as an inwardly facing curved projection at the distal end of rim 11. Sidewall 23 extends transversely upward from bottom surface 22, and rim 21 is formed as a thickened distal portion of sidewall 23. A V-shaped projection 18 extends downward from a lower surface of rim 11 and mates with a V-shaped groove 28 along the upper surface of rim 21. The mating V-shaped projection and groove 18, 28 functions as a sidewall reinforcement to resist lateral movement of the sidewalls. An inwardly facing surface 35 extends downward and laterally outward between projection 8 and hook-shaped portion 16 of rim 11, and a similarly angled outwardly facing surface 45 extends downward and laterally outward between groove 28 and undercut portion 26 of rim 21. During assembly, surface 45 aids in gradually guiding hooked-shaped portion 16 laterally outward. A plurality of vent slots 27 are located periodically in bottom rim 21. Depending on the design of the tray and the aesthetic considerations at work, vent slots 27 may be formed in top rim 11. Other than in the area of slot 27, snap-fit connection 25 is formed of mating surface to surface contact between projection 18 and groove 28, between surfaces 36 and 45, and between hook-shaped projection 16 and undercut 26.

Figure 2:
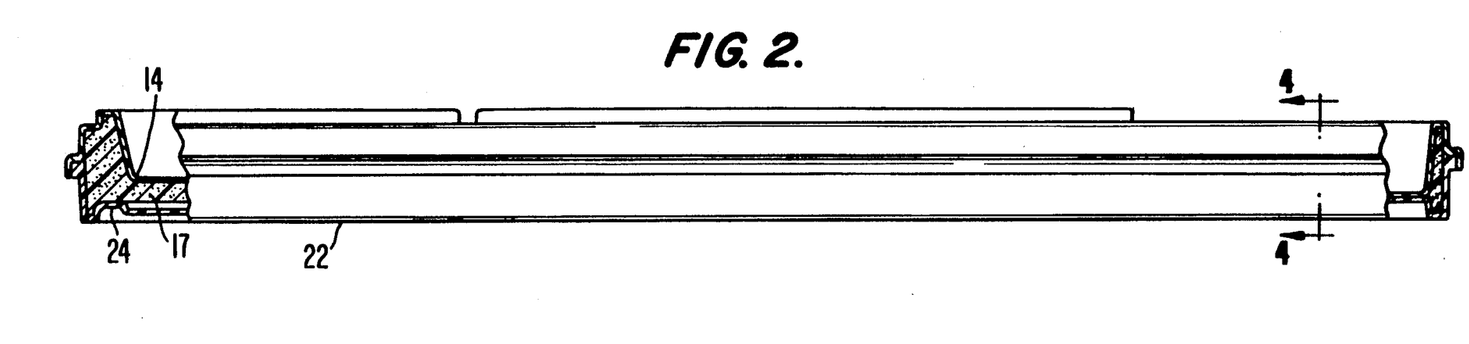
FIG. 2 is a side view, partially in section, of a tray joined with an interlocking snap-fit connection and filled with a foam insulating material.

Insulating foam 17, as seen in FIG. 2, is disposed in the interior of tray 1 and preferably contacts and bonds to substantially all the interior surfaces of top tray shell 10 and bottom tray shell 20. Insulating foam 17 is rigid and substantially dimensional stable. Foam 17, thus, not only contributes to the insulating capacity of tray 1, but also adds rigidity to the overall tray and to snap-fit connection 25. As will be discussed in reference to the process of the present invention, this added rigidity is particularly useful when the preferred flexible, chemically resistant plastics are used for shells 10 and 12.

Rigidity can be provided to the connection seam and to the overall structure of tray 1 either additionally or alternatively to a rigid foam by other means. For example, the above-mentioned mating, V-shaped projection 18 and grooves 28 resist lateral flexing of the sidewalls.

Structurally, a variety of means may be used for reinforcing sidewalls 13 and 23 at snap-fit connection 25. Sidewall reinforcements are desirable to buttress the interlocked snap-fit connection 25 against edge impacts which can cause rigid insulating foam 17 to crack and reduce the integrity of the connection. Furthermore, if cracks in the rigid foam occur adjacent the sidewalls of tray 1 due to impact at the connection seam, sidewall reinforcements can function to prevent lateral flexing of the sidewalls which would further degrade the integrity of the connection. Exemplary reinforcement means (in addition to the "V" shaped projection 19 and groove 28 discussed above) include: braces 30 (FIG. 4); thickened sidewalls 13' and 23', and thickened rim 11' (FIG. 5); stops 29' (FIG. 6); and/or ribs 19 connected to top sidewall 13 and angled surfaces 15 (FIG. 7).

Figure 7:
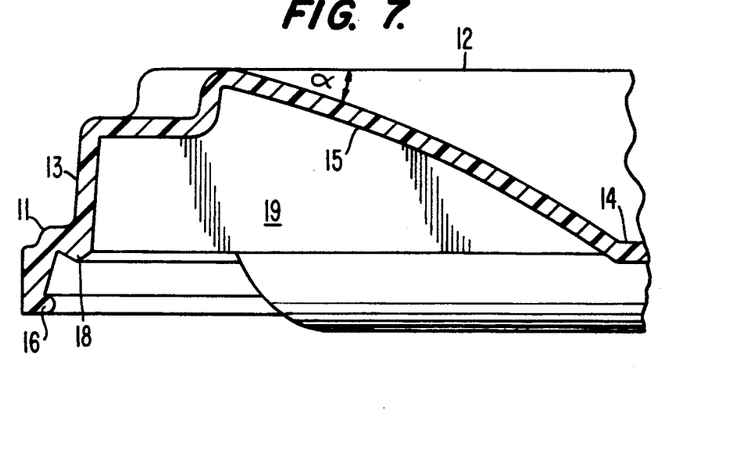
FIGS. 7 and 8 are cross-sectional views taken along lines 7—7 and 8—8 respectively of FIG. 3 illustrating reinforcing ribs that extend from a sidewall to the interior surfaces of depressions for food, utensils, cups, and other items.
Figure 8:
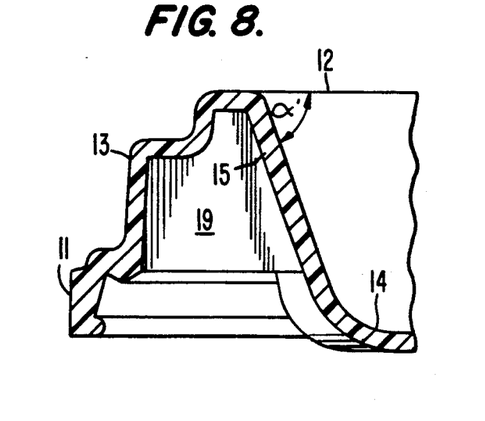

Ribs 19 are best seen in FIGS. 3, 7 and 8. Ribs 19 extend laterally inward away from top sidewall 13, and downward from top surface 12, toward the interior of tray 1 for a predetermined distance. Certain ribs 19 connect with an angled interior surface 15 of shaped depression 14. Ribs 19 may also be used in bottom shell 20 to reinforce bottom sidewalls 23 but are not illustrated in the attached figures. Attaching reinforcing ribs 19 to an angled interior surface 15 serves to transfer impact forces against snap-fit connection 25 as compression forces to the tray surface. Because the shell material is more able to resist compression, the sidewalls are made more rigid.

The number of ribs 19 that are used, as well as the size of the ribs and the number of the ribs that are connected to angled interior surfaces 15 are determined by the amount of additional rigidity which is required. For example, FIGS. 9 and 10 illustrate shorter ribs 19' in a tray where less additional rigidity is required. Where more rigidity is required (for example, because a more flexible material or thinner material is used for the shells or because of the size of the trays) a greater number of ribs, thicker or longer ribs, and/or a greater number of ribs can be used which may be connected to angled interior surfaces 15.

Another embodiment of reinforcing means is shown in dashline in FIG. 4 and comprises at least one brace 30 extending along sidewall 13 and attached to the interior of top shell 10. Preferably, braces 30 are located periodically about the perimeter of tray 1 and extend from the underside of the top planar surface of top shell 10, across the entire length of top sidewall 13 to a location beyond the interior seam of snap-fit connection 25. In a tray having a top shell sidewall 13 length of ¾ inch, the reinforcing brace 30 preferably extends beyond top rim 11 for a distance of about ¼ to 1 inch. Brace 30 may even extend across snap-fit connection 25 to the inner surface of bottom tray 20 where it could be made to snap into a suitably proportioned slot.

Ribs 19 or other vertically projecting structural elements on each shell can be made to have connecting means with interlocking shapes according to the invention. If so configured, ribs 19 would be aligned with appropriately located ribs on the bottom tray shell 20 exhibiting a mating shape to produce a snap-fit connection.

Figure 5:
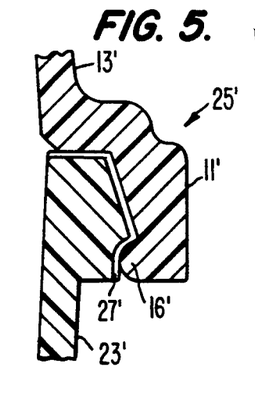
FIGS. 5 and 6 are partial cross-sectional views similar to FIG. 4 illustrating alternate, interlocking, snap-fit connections according to the invention.

FIG. 5 illustrates an alternate snap-fit connection 25 wherein the sidewall reinforcement is accomplished by thickened sidewalls 13' and 23', and thickened rim 11'.

Figure 6:
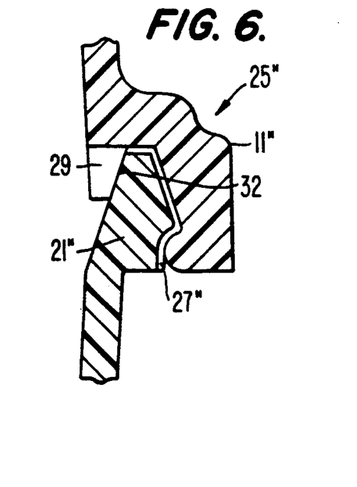

As illustrated in FIG. 6, another form of bracing in snap fit connection 25" may be used. Stops 29 are formed periodically into top rim 11 and fit into recesses 32 formed in bottom rim 21. Stops 29 and bottom rim 21 may have suitably angled faces to facilitate insertion of stops 29 into recesses 32.

Ribs 19, braces 30, and stops 29 as described above are formed as an integral element of either or both of the tray shells 10 and 20. If desired, ribs 19 may be configured to have connecting means, e.g. to fit securely within slots formed in sidewalls 13 and 23 and/or slots in the interior of top and bottom shell planar surfaces 31 and 32. It is also within the scope of the invention to use a combination of integral and added reinforcing elements. However, reinforcing elements are preferably formed integral with the shells.

FIG. 11 illustrates a mating tray cover 101, which fits on top of tray 1 to thereby define a plurality of insulated food holding compartments 114, one of which is shown in FIG. 11. Tray cover 101 extends over a portion of, or all of, tray 1 and, preferably, includes elements which interengage with elements on tray 1 so that seals are formed between the trays and covers and alternating trays and covers can be placed one on another to form a stack. A technique for forming such stacking trays and covers is illustrated in U.S. Pat. No. 3,754,640, the disclosure of which has been incorporated herein.

Tray cover 101 is formed in the same manner as tray 1; i.e. by a snap fit connection 125 joining top shell 110 to a bottom shell 120. One of the types of illustrated snap-fit connection can be used for snap-fit connection 125; however, connection 125 is preferably located adjacent to the top of cover 101 rather than in the center of the sidewall. Preferably snap-fit connection 125 is located in approximate alignment with the deepest depression in cover 101. Such a location of snap-fit connection facilitates the flame etching of the interior surfaces of shells 110 and 120. The overall depth or height of cover 101 is preferably slightly larger than the overall height of tray 1. For example, when a typical tray could have an overall height of 1.5 inches, a mating tray cover could have an overall height of 2 to 2.5 inches.

Top and bottom tray shells 10 and 20 including the top and bottom surfaces, sidewalls, rim and reinforcement means are preferably formed by injection molding techniques that are slightly modified from convention. Injection molding is characterized by little wasted material and a molded product that requires little additional processing to produce a finished appearance. In its basic elements, pressure causes pellets of a thermoplastic material to melt and flow into a void space between male and female molds. One of the molds is separated, and the part is manually or automatically removed from the remaining mold.

Occluded part elements, such as hook shaped portion 16 and undercut portion 26, pose certain difficulties in removing the molded part from the remaining mold surface, however. The occluded portions are physically disposed in the travel path of the part as the part leaves the mold surface. Unless the molded occlusion part is able to deform or flex out of the way, the newly made part cannot be removed from the mold without distorting. Such a situation is particularly troublesome with rigid plastics which would require molds of moving elements that would not hinder removal of the part. Such molds are technically possible but quite costly.

Occluded element movement is not a problem, however, when more flexible plastics are used to mold the part. Exemplary plastics having useful flexibilities for occluded element removal include polyolefins, polyolefin copolymers, halogenated polyolefins (e.g. tetrafluoroethylene and chlorotrifluoroethylene) and their copolymers (e.g. tetrafluoroethylene and hexafluoropropylene), acetal polymers, and nylons. Preferred plastics have a flexural modulus that is sufficient to allow the molded parts having occluded elements to be removed without distortion or breakage. Exemplary preferred materials are copolymers of the olefin monomers having 2-4 carbon atoms. The most preferred plastic is an intermediate impact copolymer of polypropylene and polyethylene having a flexural modulus of about 180,000 to about 190,000 psi and a deflection temperature of about 175°–180° F. at 66 psi.

Flexible plastics have a limited range of deflection that is not deleterious to the performance of a snap-fit connection but which allows the molded part to be separated from the mold surfaces without damage. Additionally, the mold does not require moving elements to allow separation of the molded part from the occluded elements. The property allows use of less costly and more conventional molds.

Many of the flexible plastics are also more chemically resistant to rinsing aids and other commercial chemicals than polycarbonates. Therefore, use of flexible plastics also increases the useful life of food service trays and tray covers in hospitals, cafeterias, airline food services, etc.

Interlocking snap-fit connections 25 are desirably formed with relatively close dimensional tolerances that provide a secure fit. The combination of the use of flexible plastics, which tend to undergo relatively large shrinkage when cooled in an unrestrained state, and the relatively large planar configuration of food service trays and tray covers, complicates the attainment of such a secure fit. The desired fits is achieved with injection molded, flexible plastics by modifying a conventional process to use a mold chilled to a temperature within a range from about 20° to about 60° F. and a post-moulding stabilization period. Preferably, the mold is cooled to about 25°–35° F. with circulating brine, water, ethylene glycol, or any other cooling liquid.

A cooled mold serves to reduce shrinkage upon removal from the mold. In general, practical food serving units have linear sides of at least about 10 inches in width and 12 inches in length to approximately 15 inches in width and 21 inches in length. A typical tray that is 20 inches long, 14 inches wide, and 1.5 inches overall height would be expected to shrink substantially in length upon removal from a heated mold. Such dimensional distortions would result in a twisted tray that could not be joined with interlocking rim elements. A cooled injection mold reduces such post-molding shrinkage to an acceptable level. Reduced shrinkage and distortion translate into snap-fit connections 25 that are dimensionally acceptable and secure.

The stabilization period is merely an extended holding time of about 45 to about 60 seconds, during which time any shrinkage tendencies are allowed to dissipate from the molded shell while the shell is dimensionally secured within the mold. Accordingly, longer or shorter holding times may be used depending on the dimensional tolerances permitted by the snap-fit configuration used.

As an example of post molding stabilization, tray parts having a hook shaped portion on the top shell and a mating undercut portion on the bottom shell are held for 50-55 seconds after molding with the mold held at 30°–35° F. The shell parts are expected to shrink about ⅜ inch over a 20-inch length (about 2%) after removal from the mold. Nonetheless, this amount of shrinkage is acceptable to form a secure snap-fit connection according to the invention. This level of shrinkage is within the tolerance of the preferred hook-and-undercut configuration and, as described below, can actually be used to eliminate the need for slots for venting air displaced by an expanding foam.

Insulating foam 17 which is incorporated into the interior of tray 1 is rigid, substantially dimensionally stable, and bonds to the shell materials. When the preferred chemically resistant shell materials are used, pretreatment of the material surface enhances this bonding action. Desirable foams 17 are self expanding foams exemplified by the polyurethanes and expanded polystyrenes. Polyurethane expands to around 30 times its initial, unreacted liquid volume which permits the relatively accurate metering of foam 17 into one or both of tray shells 10 and 20 to minimize waste.

Preferably, foam 17 is poured into bottom shell 20 which is then connected with top shell 10. The connected tray is then placed in a press or clamp to hold the dimensions of the tray accurately, resist bulging, and eliminate separation of shells 10 and 20 as the foam expands.

As foam 17 expands, air and gases within the tray interior are moved aside by physical displacement. The air and gases must be allowed to escape or they will compress until a bubble forms having sufficient pressure to withstand the force of the expanding foam. This bubble represents a nonhomogenous area within the rigid foam and, therefore, a point of weakness. Because the foam also acts to lock the top and bottom shells together rigidly, the presence of an air bubble in the foam can reduce the rigidity of the overall structure.

One way of venting displaced air is by forming vent slots 27 into top rim 11 or bottom rim 21. The embodiment where slots 27 are formed in bottom rim 21 is illustrated in FIGS. 1 and 4–6. The width, depth, number, and distribution of vent slots 27 are readily determinable with routine testing for a particular tray configuration and pouring pattern for the liquid reactants of the foam.

Vent slots 27 may be eliminated altogether if the tolerance and flexure at connection 25 is sufficient to allow displaced air to escape naturally. The rate and efficacy of such natural venting is controlled in part by using a stabilization period which does not totally eliminate post-molding part shrinkage but, rather, allows enough shrinking to occur that the snap-fit connection remains secure. The vertical force of the expanding foam against top and bottom surfaces 12 and 22 and the lateral forces against top and bottom sidewalls 13 and 23 will serve to take up most of the play in the connection 25 by forcing hook-shaped portion 16 against undercut portion 26 as the foam expands toward the sidewalls. When foam 17 reaches the sidewalls, the displaced air and gases have been vented and connection 25 becomes quite firmly locked in place. Any substantial voids in the connection seam will be sealed by foam 17 although it is contemplated that careful molding of the shells will not produce any separations between top rim 11 and bottom rim 21 at the connecting seam.

When foam 17 has expanded and cured, the tray is cleaned of my flashing or residual foam that might have exuded through openings such as the vent slots 27 and is substantially ready as a final product. Sanding and finishing of snap-fit connection 25 are not required.

When a chemically resistant material (such as the preferred polypropylene copolymer) is used, certain steps are preferably taken to enhance the bonding action between the tray and the foam. For example, the interior surface of the top and bottom tray shells 10 and 20 may be pretreated with flame etching, chemical etching, and corona discharge, Flame etching under a manifold of flame jets is a particularly preferred bonding pretreatment.

As used herein, the term "generally planar" refers to articles having their external surface area at least predominantly located along two major planar surfaces of the article excluding all surface contours. In a meal tray having compartments, the surface area is calculated on the basis of a rectangular box which has its surface area located primarily on the top and bottom planes of the article. Therefore, a tray is deemed to be "generally planar". Additionally, covers which fit over some or all of the compartments in a finished tray are considered to be "generally planar". Articles such as jugs, cups, and bowls with relatively long sidewalls, are not "generally planar" as used herein. Cups, jugs, and bowls are calculated on the basis of right cylinders or frustoconical solid shapes for the purposes of the description herein.

Having described the invention above with reference to the attached figures, it is to be understood that these figures are merely illustrative of the invention and are not intended to act as limitations on the scope and spirit of the appended claims.

I claim:

1. A process for making an insulated, plastic food serving unit formed of two interlocking parts and a rigid, expanded foam, said process comprising:

injection molding a polyolefin, polyolefin copolymer, halogenated polyolefin, copolymer of halogenated polyolefins, acetal polymer, or nylon a top shell comprising a generally planar top surface, top shell sidewalls oriented generally transverse to said top surface, a top shell rim attached to said top shell and exhibiting an interlockable physical shape, and means for reinforcing the top shell sidewalls against lateral flexure which comprises at least one reinforcement rib that extends away from the top shell sidewall for a predetermined distance as an integral part of said top shell;

injection molding a polyolefin, polyolefin copolymer, halogenated polyolefin, copolymer of halogenated polyolefins, acetal polymer, or nylon a bottom shell comprising a generally planar bottom surface, bottom shell sidewalls generally transverse to said bottom surface, and a bottom shell rim attached to said bottom shell and exhibiting a mating shape for forming a physically interlocked connection with the shape of said top connection means;

whereby vent slots are formed in one of said top shell rim or said bottom shell rim during their respective injection molding steps;

treating at least a portion of the interior top shell surfaces, at least a portion of the interior bottom shell surfaces, or at least a portion of both the top and bottom shell interior surfaces by flame etching, chemical etching, and/or corona discharge to increase the chemical bonding capabilities of the treated interior surfaces;

introducing a sufficient amount of an expanding foam into one or both of the top shell and the bottom shell to contact substantially all of the interior shell surfaces after expansion;

joining said top shell and said bottom shell by physically interlocking said top connection means and said bottom connection means; and allowing said foam to expand, seal said vent slots, and force together the interlockable shape of said top shell and the mating shape of said bottom shell and fix said top shell to said bottom shell in a secure configuration.

2. The process according to claim 1 wherein the injection molding step comprises:

injection molding said top shell and said bottom shell with a polyolefin copolymer of polypropylene and polyethylene.

3. The process according to claim 1 wherein the shaping step comprises:

shaping at least one reinforcement rib that extends away from the top shell sidewall for a predetermined distance as an integral part of said top shell.

4. The process according to claim 3 wherein the top surface further comprises depressions shaped as compartments, said depressions forming compartment surfaces oriented generally transversely to said top surface, said shaping step further comprising:

shaping at least one reinforcement rib that extends away from the top shell sidewall to a compartment surface as an integral part of said top shell.

5. The process according to claim 1 wherein the shaping step comprises:

shaping a reinforcement brace as an integral part of said top shell, said brace extending generally transversely to said top surface to a location beyond said top shell rim.

6. An insulated, plastic food serving unit formed of two interlocking parts and a rigid, expanded foam, said unit comprising:

a top shell made of a material comprising a polyolefin, polyolefin copolymer, halogenated polyolefin, copolymer of halogenated polyolefins, acetal, or nylon and exhibiting a generally planar top surface, top shell sidewalls oriented generally transverse to said top surface, and a top shell rim attached to said to shell sidewalls, said top shell rim exhibiting an interlockable hook-shaped configuration;

a bottom shell made of a material comprising a polyolefin, polyolefin copolymer, halogenated polyolefin, copolymer of halogenated polyolefins, acetal, or nylon and exhibiting a generally planar bottom surface, bottom shell sidewalls oriented generally transverse to said bottom surface, and a bottom shell rim attached to said bottom shell sidewalls and exhibiting an undercut-shaped configuration that is physically interlocked with the top shell rim, said top surface being spaced apart from the bottom surface by a vertical distance and defining an enclosed interior volume bounded by interior surfaces of the top surface, the bottom surface, and the sidewalls of the top and bottom shells that are interlocked at their rims;

whereby at least a portion of the interior top shell surfaces, at least a portion of the interior bottom shell surfaces, or at least a portion of both the top and bottom shell interior surfaces are treated by flame etching, chemical etching, and/or corona discharge to increase the chemical bonding capabilities of the treated interior surfaces; and whereby said top shell rim or said bottom shell rim exhibit vent slots;

means for reinforcing the top shell sidewalls, the bottom shell sidewalls, or both the top and bottom shell sidewalls against lateral flexure, said means for reinforcing comprising at least one reinforcement rib that extends away from the top shell sidewall for a predetermined distance as an integral part of said top shell; and an expanded foam within said enclosed interior volume and chemically bonded to substantially all of said interior surfaces sealing said vent slots, and positioned to force together the interlockable shape of said top shell and the mating shape of said bottom shell to fix said top shell to said bottom shell in a secure configuration.

7. An article according to claim 6 wherein the reinforcing means comprises a plurality of reinforcing ribs integral with and extending away from the top shell sidewalls.

8. An article according to claim 6 wherein the reinforcing means comprises a plurality of reinforcement braces that extend from the interior surface of the top surface to a location beyond said top shell rim.

9. An article according to claim 6 further comprising vent slots in said top shell and/or said bottom shell.

10. An article according to claim 9 wherein the vent slots are formed into the bottom shell rim.

11. An article according to claim 6 wherein the top shell rim further exhibits a V-shaped ridge and said bottom rim exhibits a V-shaped groove in which said groove seats to decrease flexure of the sidewalls.

12. An insulated food serving unit according to claim 6 wherein at least one depression is formed in said top or bottom surface to define at least one compartment.

13. An insulated food serving unit according to claim 12 wherein said unit is a food serving tray and said at least one depression is formed in said top surface.

14. An article according to claim 13 wherein the reinforcement means comprises a plurality of reinforcement ribs extending from a top shell sidewall to a compartment surface.

15. An insulated food serving unit according to claim 12 wherein said unit is formed as a food serving tray cover and said at least one depression is formed in said bottom surface.

16. An insulated food serving unit according to claim 6 wherein said hook-shaped configuration is located around substantially the entire perimeter of said top shell rim, and said undercut-shaped configuration is located around substantially the entire perimeter of said bottom shell rim whereby an interlockable, snap-fit connection is formed around substantially the entire perimeter of the unit.

17. An insulated food serving unit according to claim 16 wherein said top shell rim is formed as a thickened distal end portion of said top shell sidewall and said hook-shaped configuration is formed as an inwardly facing generally curved projection on said top shell rim.

18. An insulated food serving unit according to claim 17 wherein said bottom shell rim is formed as a thickened distal end portion of said bottom shell sidewall and said undercut portion is formed as an outwardly facing generally curved indentation in said bottom shell rim.

19. An insulated food serving unit according to claim 18 wherein the reinforcing means comprises stops formed periodically into the top shell rim and a recess formed into the bottom shell rim, said stops and said recess having suitable angled faces to facilitate insertion of said stops into said recesses.

20. An insulated food serving unit according to claim 16 wherein said hook-shaped configuration and said undercut-configuration are located approximately in the middle of the overall height of said unit.

21. An insulated food serving unit according to claim 16 wherein said hook-shaped configuration and said undercut configuration are located between the middle and the top of the overall height of said unit.

22. The process according to claim 1 wherein the treating step comprises:

flame etching the interior surfaces of the top shell and the interior surfaces of the bottom shell.

* * * * *